United States Patent
McDonald et al.

(10) Patent No.: US 10,495,758 B2
(45) Date of Patent: Dec. 3, 2019

(54) SYSTEMS AND METHODS USING MULTI FREQUENCY SATELLITE MEASUREMENTS TO MITIGATE SPATIAL DECORRELATION ERRORS CAUSED BY IONOSPHERE DELAYS

(71) Applicant: Honeywell International Inc., Morristown, NJ (US)

(72) Inventors: James Arthur McDonald, Minneapolis, MN (US); Tom Jakel, Rapid City, SD (US)

(73) Assignee: Honeywell International Inc., Morris Plains, NJ (US)

(*) Notice: Subject to any disclaimer, the term of this patent is extended or adjusted under 35 U.S.C. 154(b) by 566 days.

(21) Appl. No.: 14/671,825

(22) Filed: Mar. 27, 2015

(65) Prior Publication Data
US 2016/0282470 A1 Sep. 29, 2016

(51) Int. Cl.
G01S 19/05 (2010.01)
G01S 19/07 (2010.01)
G01S 19/08 (2010.01)

(52) U.S. Cl.
CPC ............ G01S 19/05 (2013.01); G01S 19/07 (2013.01); G01S 19/08 (2013.01)

(58) Field of Classification Search
CPC .......... G01S 19/05; G01S 19/07; G01S 19/08; G01S 19/12; G01S 19/25; G01S 19/252;
(Continued)

(56) References Cited

U.S. PATENT DOCUMENTS 5,828,336 A 10/1998 Yunck et al.
6,407,700 B1 6/2002 Giffard
(Continued)

FOREIGN PATENT DOCUMENTS

EP 2363730 9/2011

OTHER PUBLICATIONS

Lee et al., "Enhancements of Long Term Ionospheric Anomaly Monitoring for the Ground-based Augmentation System," Jan. 2011, International Technical Meeting of the Institute of Navigation, pp. 930-940.*

(Continued)

*Primary Examiner* — Bernarr E Gregory
*Assistant Examiner* — Daniel P Malley, Sr.
(74) *Attorney, Agent, or Firm* — Fogg & Powers LLC (57) ABSTRACT

Systems and methods for using multi frequency satellite measurements to mitigate spatial decorrelation errors caused by ionosphere delays are provided. In one embodiment, a GBAS comprises: a plurality of GNSS reference receivers that receive signals from GNSS satellites; at least one processing module; at least one aircraft communication device; wherein the processing module determines a TEC along a line of sight of a first observable multi-frequency GNSS satellite to determine a current quality metric of the ionosphere; determines at least one overbounded Vertical Ionosphere Gradient standard deviation sigma-vig ($\sigma_{vig}$) when the current quality metric of the ionosphere meets a threshold; defines one or more valid iono regions at a given finite period in time where at least one $\sigma_{vig}$ is applicable; and causes the communication device to communicate to an aircraft the $\sigma_{vig}$ and a list of GNSS single and multi-frequency satellites having pierce points in the valid iono regions.

20 Claims, 4 Drawing Sheets

(58) Field of Classification Search
CPC ...... G01S 19/254; G01S 19/256; G01S 19/40; G01S 13/0218; G01S 5/14; H04B 7/22; H04B 7/185
See application file for complete search history.

(56) References Cited

U.S. PATENT DOCUMENTS

| | | | |
|---|---|---|---|
| 6,552,680 B1 | 4/2003 | Barber et al. | |
| 6,781,542 B2 | 8/2004 | Hoven | |
| 7,256,730 B2 | 8/2007 | Hernandez-Pajares et al. | |
| 7,289,061 B2 | 10/2007 | Komjathy et al. | |
| 8,085,196 B2 | 12/2011 | Whitehead | |
| 8,193,979 B2 | 6/2012 | McBurney | |
| 2005/0212696 A1 | 9/2005 | Bartone et al. | |
| 2006/0017610 A1* | 1/2006 | Komjathy | G01S 19/07 342/357.31 |
| 2006/0080038 A1* | 4/2006 | Jakowski | G01S 19/14 702/2 |
| 2009/0182502 A1* | 7/2009 | Riter | G01S 19/07 701/472 |
| 2012/0050097 A1* | 3/2012 | Zhang | G01S 19/07 342/357.26 |
| 2013/0332072 A1* | 12/2013 | Janky | G01S 19/07 701/469 |
| 2014/0062765 A1* | 3/2014 | Brenner | G01S 19/07 342/357.3 |
| 2014/0163938 A1 | 6/2014 | Sparks et al. | |
| 2014/0285376 A1* | 9/2014 | Scheitlin | G01S 19/08 342/357.66 |
| 2014/0292573 A1 | 10/2014 | Drescher et al. | |
| 2015/0051837 A1* | 2/2015 | Kelley | G01V 1/28 702/3 |
| 2016/0282470 A1* | 9/2016 | McDonald | G01S 19/05 |

OTHER PUBLICATIONS

Srinivas et al., "Investigation of the Effect of Ionospheric Gradients on GPS Signals in the context of LAAS," Progress in electromagnetics Research B, vol. 57, 2014, pp. 191-205.*
Circiu et al., "Evaluation of Dual Frequency GMAS Performance using Flight Data", "Proceedings of the Ion ITM", 2014, pp. 1-12.
Konno, "Dual-Frequency Smoothing for CAT III LAAS: Performance Assessment Considering Ionosphere Anomalies", "Proceedings of the 20th International Technical Meeting of the Satellite Division of the Institute of Navigation (ION GNSS 2007)", 2007, pp. 1-14.
Majithiya et al., "Indian Regional Navigation Satellite System", "InsideGNSS", Jan./Feb. 2011, pp. 40-46.
Ramakrishnan et al., "Targeted Ephemeris Decorrelation Parameter Inflation for Improved LAAS Availability during Severe Ionosphere Anomalies", "Proceedings ION NTM", 2008, pp. 1-13.
Sunehra, "Real-Time Estimation of Ionospheric Delay Using Dual Frequency GPS Observations", "European Scientific Journal", May 2013, pp. 36-50, vol. 9 15.
Takeyasu et al., "3-1-2 Air Navigation with Global Navigation Satellite Systems and the Ionospheric Effects", "Journal of the National Institute of Information and Communications Technology", 2009, pp. 231-242, vol. 56, No. 1-4.
European Patent Office, "Extended European Search Report from EP Application No. 16164340.8 dated Jul. 11, 2016", "from Foreign Counterpart of U.S. Appl. No. 14/691,455", filed Jul. 11, 2016, pp. 1-9, Published in: EP.
Jakel et al., "Using of Code Minus Carrier Measurements to Mitigate Spatial Decorrelation Errors Caused by Ionosphere Delays", "U.S. Appl. No. 14/691,455, filed Apr. 20, 2015", Apr. 20, 2015, pp. 1-29, Published in: US.
Lee et al., "Enhancements of Long Term Ionospheric Anomaly Monitoring for the Ground-Based Augmentation System", "Proceedings of the 2011 International Technical Meeting of the Institute of Navigation", Jan. 26, 2011, pp. 930-941.
Lee et al., "Assessment of Nominal Ionosphere Spatial Decorrelation for LAAS", "Proceedings of IEEE/ION Plans 2006", Apr. 27, 2006, pp. 506-514.
Lee et al., "Position-Domain Geometry Screening to Maximize LAAS Availability in the Presence of Ionosphere Anomalies", "ION GNSS 19th International Technical Meeting of the Satellite Division 2006", , pp. 1-16.
Murphy et al., "More Ionoshphere Anomaly Mitigation Considerations for Category II/III GBAS", "GNSS 2007—Proceedings of the 20th International Technical Meeting of the Satellite Division of the Institute of Navigation", Sep. 28, 2007, pp. 438-452, Publisher: The Institute of Navigation, Published in: US.
Simili et al., "Code-Carrier Divergence Monitoring for the GPS Local Area Augmentation System", "IEEE/ION Position, Location, and Navigation Symposium 2006", 2006, pp. 483-493.
Zhao et al., "Detecting Ionospheric Threat for GBAS Based on Spatial-temporal Method", "Proceedings of the 26th International Technical Meeting of the ION Satellite Division", Sep. 20, 2013, pp. 1428-1434, Publisher: ION GNSS+.
European Patent Office, "Extended European Search Report", "Foreign Counterpart to U.S. Appl. No. 14/671,825", dated Aug. 25, 2016, pp. 1-10, Published in: EP.
Pi et al., "Observations of Global and Regional Ionospheric Irregularities and Scintillation Using GNSS Tracking Networks", Apr. 23, 2013, pp. 752-761, Publisher: Proceedings of the Institute of Navigations Pacific PNT 2013, Published in: US.
United States Patent and Trademark Office, "Notice of Allowance", "From U.S. Appl. No. 14/691,455", dated Nov. 7, 2017, pp. 1-10, Published in: US.
United States Patent and Trademark Office, "Office Action", "From U.S. Appl. No. 14/691,455", dated May 18, 2017, pp. 1-37, Published in: US.
El-Gizawy, ": Development of an Ionosphere Monitoring Technique Using GPS Measurements for High Latitude GPS Users", "UCGE Reports No. 20171", Mar. 2003, pp. 1-173, Publisher: Department of Geomatics Engineering, Published in: Calgary, Alberta.
Pullen et al., "An Overview of GBAS Integrity Monitoring With a Focus on Ionospheric Spatial Anomalies", "Indian Journal of Radio & Space Physics vol. 36, Aug. 2007", May 14, 2007, pp. 249-260.

* cited by examiner

SYSTEMS AND METHODS USING MULTI FREQUENCY SATELLITE MEASUREMENTS TO MITIGATE SPATIAL DECORRELATION ERRORS CAUSED BY IONOSPHERE DELAYS

BACKGROUND

Global Navigation Satellite Systems (GNSS) provide aircraft with navigation support in approach and landing operations. However, since the accuracy and precision requirements are high in these operations, Ground Based Augmentation Systems (GBAS) augment GNSS when an aircraft is near a GBAS Ground Subsystem. GBAS Ground Subsystems, also referred to herein as GBAS stations or ground stations, augment GNSS receivers by broadcasting pseudorange corrections and integrity information to the aircraft, which helps remove GNSS errors impacting satellite measurements processed by the aircraft's GNSS receiver. As a result, aircraft can have improved continuity, availability, and integrity performance for precision approaches, departure procedures, and terminal area operations.

A Global Navigation Satellite System (GNSS), as that term is used herein, refers to a system that utilizes a constellation of orbiting satellite for the purpose of calculating navigation and/or position solutions. Example GNSSs include, but are not limited to, the United States' Global Positioning System (GPS), Russia's Global'naya Navigatsionnaya Sputnikovaya Sisterna (GLONASS), China's Compass, the European Union's Galileo, India's Indian Regional Navigational Satellite System (IRNSS), and Japan's Quasi-Zenith Satellite System (QZSS).

One major source of error in a GNSS receiver can occur when a GNSS signal experiences delay as it passes through the ionosphere. This error can almost be completely mitigated by the GBAS station when the ionosphere is uniform between the aircraft's GNSS receiver and the GBAS station because the GBAS station and the aircraft's GNSS receiver will be experiencing similar signal delays due to uniformity of the ionosphere. However, when ionospheric disturbances produce a non-uniform ionosphere that results in differences in the delay observed by the GBAS station as opposed to the delay observed by the aircraft's GNSS receiver, the pseudorange corrections broadcast by the GBAS ground station and applied by the airborne user can result in unacceptably large position errors in the aircraft's navigation position solution. Further, conventional GBAS systems could assume that the worst case ionospheric gradient is always present and mitigate errors resulting from large ionospheric gradients using the technique of geometric screening. However, this may impact continuity and lead to loss of availability of the system.

For the reasons stated above and for other reasons stated below, it will become apparent to those skilled in the art upon reading and understanding the specification, there is a need in the art for improved systems and methods for mitigating spatial decorrelation errors caused by ionosphere delay.

SUMMARY

The Embodiments of the present disclosure provide systems and methods for using multi frequency satellite measurements to mitigate spatial decorrelation errors caused by ionosphere delays and will be understood by reading and studying the following specification.

In one embodiment, a Ground Based Augmentation System (GBAS) comprises: a plurality of Global Navigation Satellite Systems (GNSS) reference receivers configured to receive signals from single and multi-frequency GNSS satellites; at least one processing module coupled to the plurality of reference receivers; at least one aircraft communication device coupled to the at least one processing module; wherein the at least one processing module is configured to determine a true electron count (TEC) along a line of sight of a first GNSS satellite of a plurality of observable multi-frequency GNSS satellites to determine a current quality metric of the ionosphere; wherein the at least one processing module is further configured to determine at least one overbounded Vertical Ionosphere Gradient standard deviation sigma-vig ($\sigma_{vig}$) when the current quality metric of the ionosphere meets a threshold; wherein the at least one processing module is further configured to define one or more valid iono regions at a given finite period in time where at least one overbounded Vertical Ionosphere Gradient standard deviation sigma-vig ($\sigma_{vig}$) is applicable; and wherein the at least one processing module is further configured to cause the at least one aircraft communication device to communicate to an aircraft's GNSS receiver the at least one overbounded Vertical Ionosphere Gradient standard deviation sigma-vig ($\sigma_{vig}$) and a list of GNSS single and multi-frequency satellites that have pierce points in the valid iono regions.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. These embodiments are described in sufficient detail to enable those skilled in the art to practice the invention, and it is to be understood that other embodiments may be utilized and that logical, mechanical, and electrical changes may be made. The following detailed description is, therefore, not to be taken in a limiting sense.

Embodiments disclosed herein address the issues associated with anomalous ionospheric storms by implementing a Ground Based Augmentation System (GBAS) utilizing information from Global Navigation Satellite Systems (GNSS) multi-frequency satellites to determine techniques to be used for mitigation of spatial decorrelation errors caused by ionosphere delays. The measurement information obtained by the GBAS ground station from the multi-frequency satellites is used to define regions of the sky where the ionosphere is healthy. These regions are defined as valid iono regions for a given finite period in time. Measurement information received from any satellites observable by the GBAS ground station that fall within the valid iono regions during the given finite period of time can be applied by the aircraft.

Embodiments of the present disclosure described herein use data obtained by utilizing multi-frequency satellites to determine the technique to be used to mitigate the errors in GNSS satellite measurements caused by ionospheric delays. The GBAS reference receivers located at the ground station receive at least two signals from multi frequency satellites. As the term is used herein, a multi-frequency satellite simultaneously transmits navigation signals at multiple frequencies. By simultaneously processing two navigation signals of differing frequencies from a single satellite, the GBAS ground station can determine the quality of the ionosphere in the region around the satellite at any given finite period of time.

The signals transmitted by the GNSS satellites include information, including but not limiting to, the signal's time of transmission and position of the GNSS satellite at the time of transmission. This information is also referred to as GNSS data herein. The GBAS reference receivers process these signals and measures the time of transmission between the multi-frequency satellites and the respective GBAS reference receiver. The GBAS reference receivers determine the distance the signals traveled based on the time of transmission. A GBAS processing module receives these measurements and determines the error in the measurement by comparing the traveled distance with the actual distance from satellite to the respective GBAS reference receiver. Based on these measurements, the GBAS processing module calculates a correction term for the aircraft to apply.

In some cases, residual errors remain after application of differential correction term. In such cases, the GBAS ground station includes integrity-related parameters that allow determination of statistical bound of the position error of the aircraft. In exemplary embodiments, the position is bound by a cylindrical shaped boundary, referred to as a protection limit, around the aircraft having a vertical component and a lateral component. In other embodiments, boundaries having other shapes are used. In exemplary embodiments, the vertical component is bound to less than 10 meters such that the aircraft is actually within 10 meters of where it thinks it is with a high probability (such as $1-10^{-7}$)

GBAS are sensitive to differential range errors caused by spatial decorrelation in the ionosphere induced delay on GNSS satellite signals (this phenomenon is referred to as an ionospheric gradient). Under nominal conditions, this variation in delay can be accounted for via a standard deviation (sigma) broadcast by the GBAS which is utilized by the airborne user. A simple overbound of Vertical Ionosphere Gradient standard deviation sigma-vig ($\sigma_{vig}$) is used. The overbound is a conservative representation of the error distribution used by the ground station based on the worst possible error that could be present on a GNSS satellite based on information from the multi-frequency satellites in view. Overbounding of the $\sigma_{vig}$ can be accomplished by increasing the error bounding distance from the aircraft by adding a K factor and/or a sigma multiplier. For example, a one meter one sigma type error indicating that 67% of the time the aircraft is within one meter and is Gaussian distributed can be statistically overbound to 95% by multiplying it by two and broadcasting to a user that there is a two meter $\sigma_{vig}$ overbound on this ranging source. This assures that 95% of the time, the range error is not going to exceed 2 meters during fault free conditions.

Under nominal conditions, the difference in the ionospheric delays experienced by the GBAS ground station and the aircraft's GNSS receiver is below a threshold. In such a case, the ionosphere is determined to be healthy and a simple technique of overbounding the $\sigma_{vig}$ can be used. If the difference is above a threshold, the ionosphere is not healthy and the $\sigma_{vig}$ may require overbound or the satellite measurements may have to be excluded from the broadcast list of corrections.

Under anomalous ionospheric storms, elevated ionospheric activity, ionosphere induced delays, and ionospheric gradients, more complicated methods of mitigation are required such as inflation of the $\sigma_{vig}$ or removal of the satellite measurements. These ionospheric disturbances occur in the upper atmosphere and are based on electronic activity induced by solar flares and other solar activity. It is possible during anomalous ionospheric activity for a spatial variation in the delay experienced by the ground substation and airborne user to form, such that the airborne user could experience unacceptably large position errors, which could be prohibitive to safe precision approach operations. Presence of ionospheric disturbances such as ionospheric gradients and depletion bubbles in the earth's atmosphere can also result in loss of availability and impact continuity of the navigation system. Continuity refers to how often the system is interrupted from use, and availability refers to how often the system is usable for an extended period of time, for example, over the course of the day.

Figure 1A:
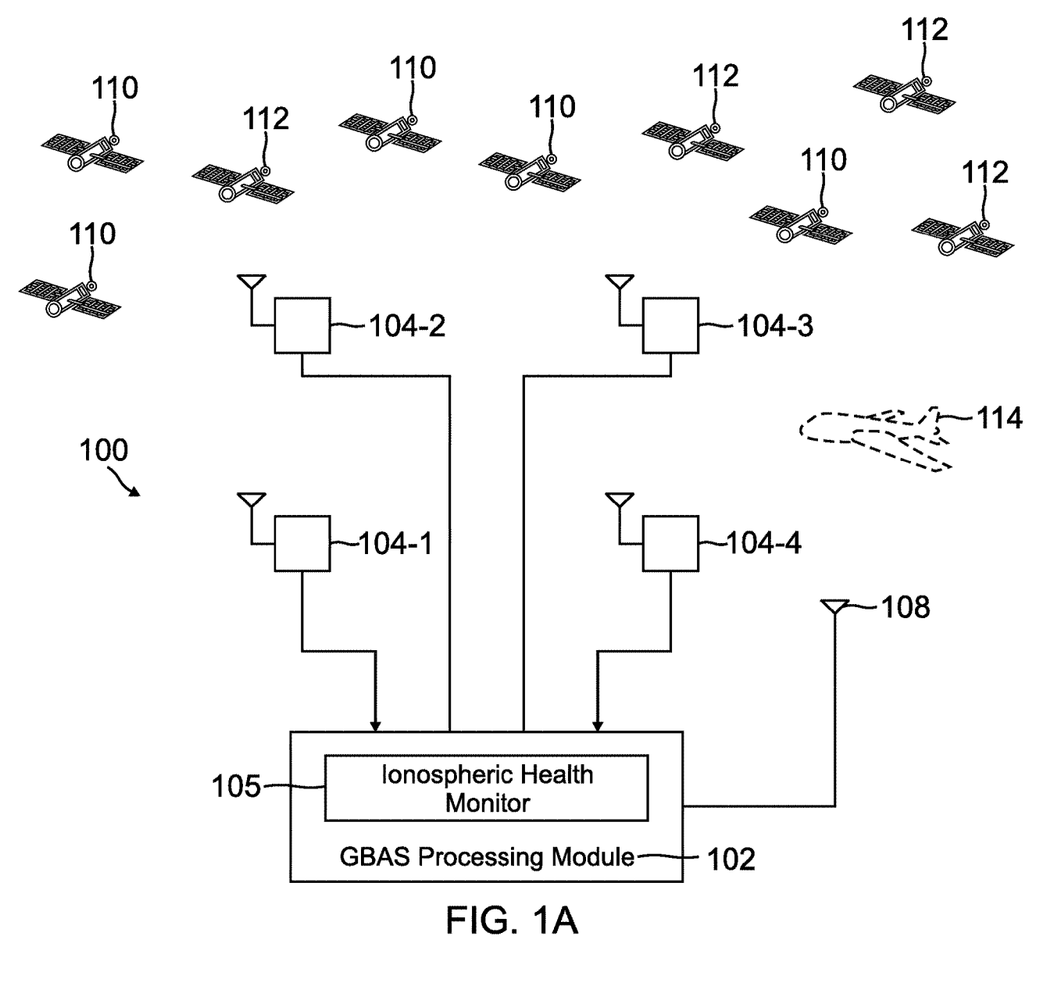
FIG. 1A is an exemplary embodiment of a Ground Based Augmentation System (GBAS) that uses multi-frequency satellites to select an ionospheric mitigation mechanism by defining regions of the sky that have a healthy ionosphere.

FIG. 1A describes a multi-frequency GBAS ground station 100 for one embodiment of the present disclosure. GBAS ground station 100 includes an ionospheric health monitor 105 that utilizes multi-frequency GNSS satellites to determine correct ionosphere mitigation mechanism. As the term is used herein, a multi-frequency satellite simultaneously transmits navigation signals at multiple frequencies. These navigation signals will experience speed delays that differ according to a function of their frequency. The delays in these signals caused by the ionosphere can be estimated and resolved by processing these signals as received by GBAS ground station 100 at the same time. Thus, by simultaneously processing two navigation signals of differing frequencies from a single satellite, the ground station 100 can determine the quality of the ionosphere in the region around the satellite at any given finite period of time.

In the embodiment shown in FIG. 1A, GBAS ground station 100 includes a Ground Based Augmentation System (GBAS) processing module 102 that implements the ionospheric health monitor 105. GBAS processing module 102 is coupled to one or more GBAS reference receivers 104 (shown in FIG. 1 as receiver 104-1, receiver 104-2, receiver 104-2 and receiver 104-4) located at the ground station 100, an aircraft communication device 108 for communicating corrections to one or more aircraft 114. In the example shown in FIG. 1, the GBAS processing module 102 is configured to four reference receivers. In other embodiments, a greater or fewer number of reference receivers 104 may be included. The reference receivers 104 of GBAS ground station 100 are configured to process both multi-frequency satellite signals (received from multi-frequency GNSS satellites 112) and single frequency satellites signals (received from multi-frequency GNSS satellites 110). At least one of the reference receivers used in the GBAS system herein is configured to process multi-frequency satellite signals. For example, one or all of the reference receivers 104-1, 104-2, 104-3 and 104-4 can be configured to process multi-frequency satellite signals. In such an example, the remaining reference receivers process single frequency satellite signals. In other implementations, reference receivers 104-1, 104-2, 104-3 and 104-4 could be configured to receive single frequency satellite signals and one or more additional reference receivers is implemented to receive multi-frequency satellite signals. The GBAS reference receivers 104 and the aircraft communication device 108 are coupled with the GBAS processing module 102.

The GBAS reference receivers 104 are configured to receive GNSS signals from the in-view multi-frequency GNSS satellites 112 and single frequency satellites 110. In an implementation of this embodiment, the location of the GBAS reference receivers 104 are pre-known. The GBAS reference receivers 104 process these signals and measure the time between the time of transmission from the multi-frequency satellites and the time of reception by the respective GBAS reference receiver 104. The GBAS reference receivers determine the distance the signals traveled based on the time of transmission. This information is then utilized by the GBAS processing module 102 and ionospheric health monitor 105.

Figure 1B:
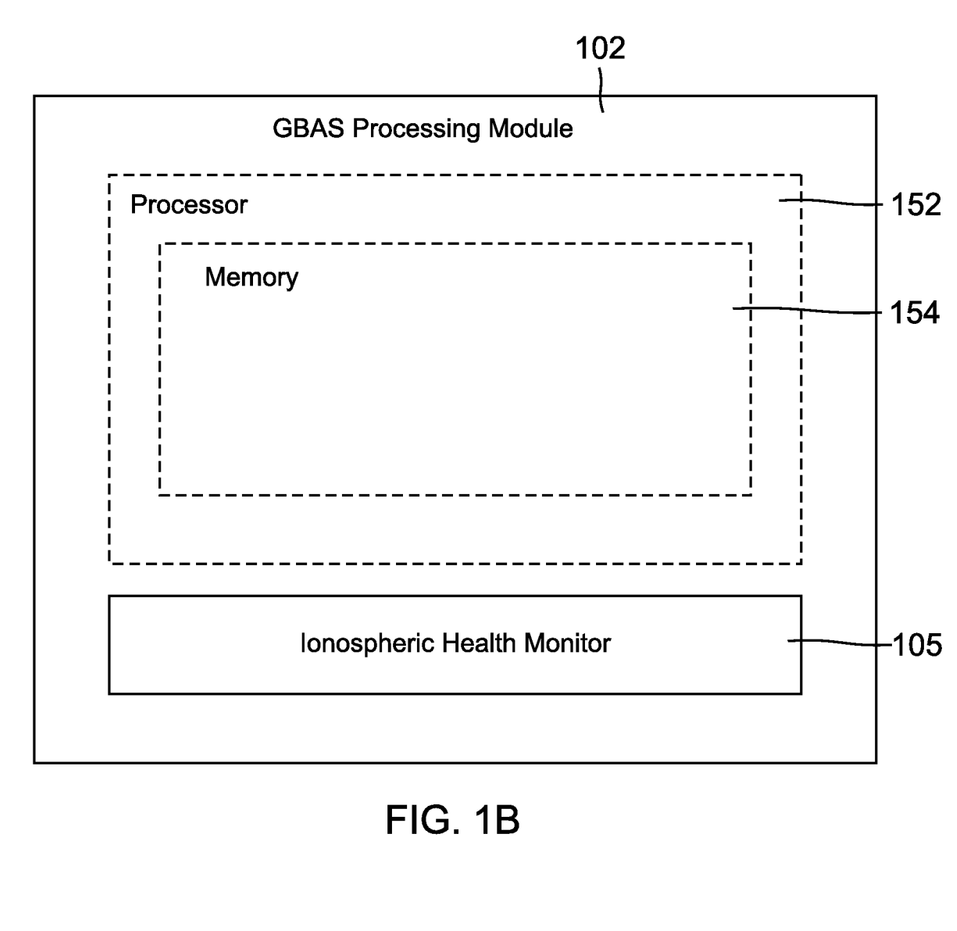
FIG. 1B is an exemplary embodiment of a GBAS processing module in a GBAS ground station such as the one described in FIG. 1A.

As shown in FIG. 1B, in one embodiment, GBAS processing module 102 may include a processor 152 configured to implement the ionospheric health monitor 105. Ionospheric health monitor 105 is coupled to a memory 154 that includes software program, or other computer readable instructions for carrying out the ionospheric health monitor 105 including various methods, process tasks, calculations, and control functions, used in the functionality described herein. These instructions can be stored on any appropriate tangibly computer readable medium used for storage of computer readable instructions or data structures. The computer readable medium can be implemented as any hardware device that can be accessed by a general purpose processor (GPP) or special purpose computer or processor (such as a field-programmable gate array (FPGA), application-specific integrated circuit (ASIC) or other integrated circuit), or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc.

The satellite signals at each frequency are processed by ionospheric health monitor 105 to determine the quality of the ionosphere. The ionospheric health monitor 105 determines the total electron count (TEC) in the ionosphere along the satellite's line of sight. The point at which the satellite's line of sight from a respective GBAS reference receiver intersects with the ionosphere is the pierce point for the particular satellite. The TEC is proportional to the delay experienced by the signal due to the disruption in the ionosphere. Under nominal conditions, the transmission time delay due to the TEC on satellite signals ranges from a few meters to 10 meters. However, during severe ionosphere storms, this delay can reach up to more than 100 meters. In some implementations, this TEC can be quantified by the ionospheric health monitor 105 from the measurements by a linear combination of the measured pseudorange and phase observations registered by the GBAS reference receivers 104 at the two carrier frequencies. Using the TEC, the ionospheric health monitor 105 determines the quality of the ionosphere ranging from quiet to storm. The TEC determines the ionosphere quality metric at the pierce point and if it has been met by the dual frequency satellite 112. The ionosphere at the pierce point is determined to be healthy when the current quality metric of the ionosphere meets a threshold.

If the quality metric of the ionosphere has been met, the dual frequency satellite measurement can be used for computation of GBAS ground station 100's differential corrections and a simple technique of overbounding can be used for mitigation of the spatial ionosphere decorrelation error. These differential corrections are generated using the location of the GBAS references receivers 104. In some examples of the embodiment, the location of the GBAS reference receivers 104 is pre-known. The GBAS reference receivers 104 determines the distance traveled by the satellite signals based on the time of transmission. The GBAS processing module 102 receives these measurements and determines the error by comparing the traveled distance of the signal with the actual distance from satellite to the respective GBAS reference receiver. The average error measured by all operational reference receivers is the correction term that can be processed by the aircraft's GNSS receiver to compensate for the delay in signal along the aircraft's line of sight. The GBAS ground station 100 processes signals from all multi-frequency satellites 112 in view to compile the list of broadcast corrections to be utilized by the aircraft.

Figure 2:
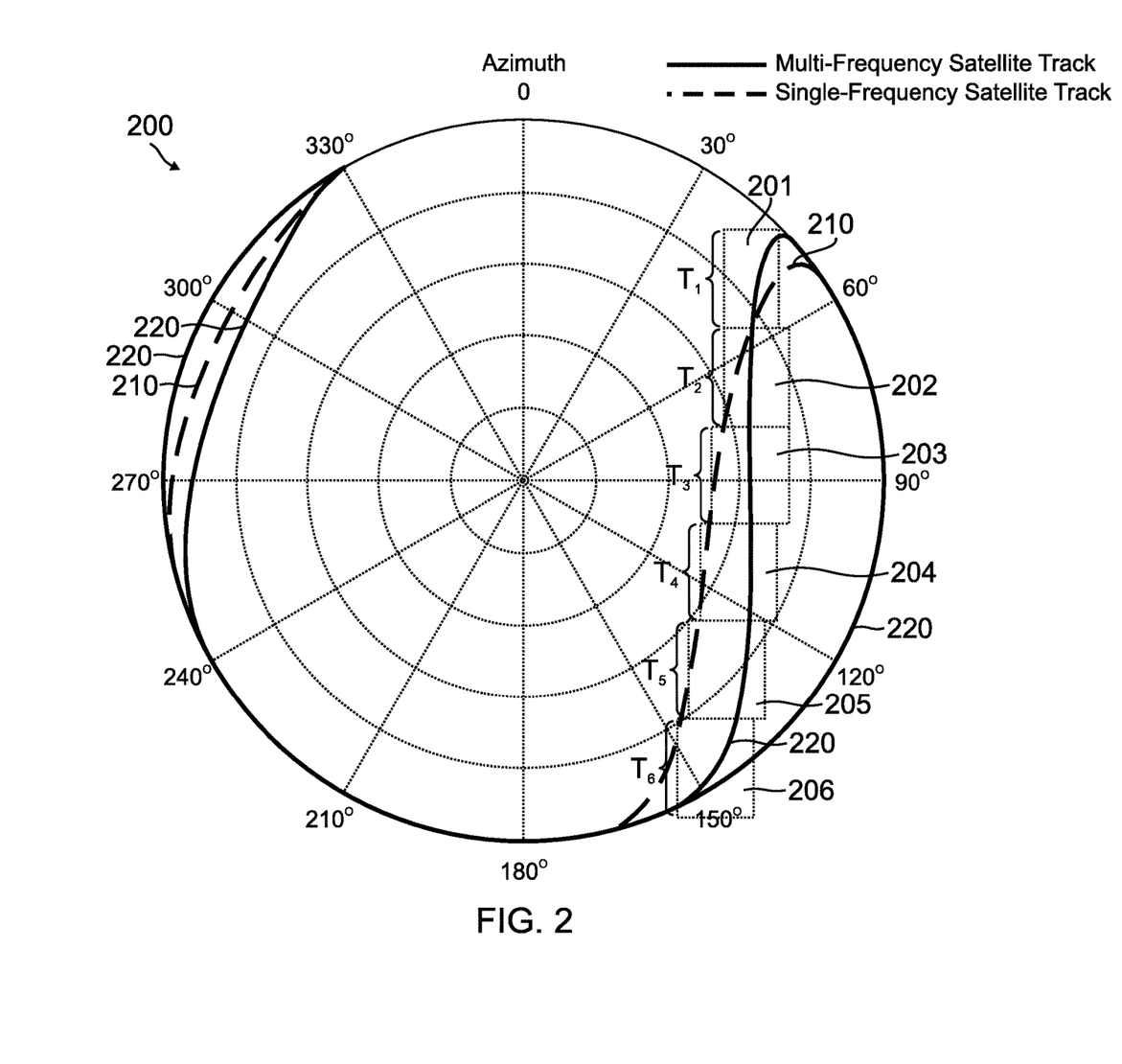
FIG. 2 is chart of the sky illustrating example valid iono regions defined using multi-frequency satellite track seen from the perspective of a GBAS ground station such as the GBAS ground station described in FIG. 1.

After determining that the satellite measurement can be used as part of the broadcast corrections, a corresponding overbound Vertical Ionosphere Gradient standard deviation sigma-vig for the spatial ionosphere decorrelation error is set. The ground station 100 then processes the information received by the GNSS reference receivers 104 from one or more other multi-frequency satellites observable by the GBAS ground station 100 to determine the health of the ionosphere at pierce points of the multi frequency satellites 112 and defines valid iono regions (VIR) of the sky where the same sigma overbound value is applicable. In some examples, the bound of the VIRs are defined based on the quality metric. Thus, if the ionosphere is healthy the VIR could be defined by 50 nautical miles as opposed to a bound of 25 nautical miles if the ionosphere is not as healthy. The bounds of the valid iono region can be even smaller if the health of the ionosphere is more severe. Further, in one implementation, the VIRs can be rectangular (as shown in FIG. 2). In other implementations, the VIRs can be circular or any other geometric shape.

FIG. 2 is chart of the sky illustrating example valid iono regions (VIRs) defined using a multi-frequency satellite 112 track seen from the perspective of a GBAS ground station such as GBAS ground station 100 described in FIG. 1. In the example shown in FIG. 2, a multi frequency satellite travels along track 220. The GBAS ground station 100 observes this multi-frequency satellite and ionospheric health monitor 105 determines whether the ionosphere surrounding track 220 at a given finite period in time is healthy. For example, if a multi-frequency satellite at time T1 has a pierce point within region 201, and at that time the ionosphere is healthy, then iono region 201 is defined as valid iono region. The multi frequency satellite, traveling along its orbital path, will subsequently move along track 220 and enter into iono region 202 at time T2, iono region 203 at time T3 and so on. The GBAS processing module 100 processes the navigation signals received from the multi-frequency satellite and checks if the ionosphere in the respective iono region is healthy at each respective region along track 220. When an iono region is defined as a valid iono region, it is only considered valid for that finite period in time in which the multi-frequency satellite has a pierce point falling within that iono region.

FIG. 2 further shows a single frequency satellite 110 as viewed by the GBAS ground station 100 along track 210. The GBAS processing module 102 may broadcast differential corrections for the single frequency during the given finite period in which the pierce point of the single frequency satellite falls within a valid iono region, as defined using multi-frequency satellites. That is, when a pierce point for a single frequency satellite 110 exists within an iono region currently co-occupied by a multi-frequency satellite 112, and ionospheric health monitor 105 has determined that iono region to be a valid iono region, then GBAS processing module 102 may leverage that determination when broadcasting differential corrections associated with the single frequency satellite 110. For example, single frequency satellite measurement for the satellite shown in FIG. 2, is most reliable at time T1 and T2 (that is, within the valid iono regions 201 and 202) when the single frequency satellite 110 has a pierce point nearest to the pierce point of the multi frequency satellite 112's track 210. By time T6, track 210 of the pierce point of the single frequency satellite 110 has significantly traveled away from the multi-frequency satellite track 220 so that valid iono region 206 no longer includes the single frequency satellite.

The VIRs have a healthy ionosphere at a given finite period in time so that any satellites, single and multi-frequency, that have pierce points in the VIR during that given time period can be presumed to not have excessive spatial decorrelation. GNSS satellites that have pierce points in the VIR are assumed to have a nominal delay and simple error overbounding mitigation mechanism can be used to compute the corrections. The GBAS processing module 102 processes signals from all GNSS satellites 110 and 112 in view to determine if the satellites are in a VIR.

In various different embodiments, multi-frequency satellites from differing GNSS constellations can be utilized to define VIR. That is, a VIR determination made by ionospheric health monitor 105 on the basis of navigation signals from a multi-frequency satellite of a first GNSS constellation (Galileo, for example) may be utilized to determine differential corrections associated with a satellite from a second, different GNSS constellations (GPS, for example). In a further implementation, the GBAS processing module 102 is configured to broadcast differential corrections for satellites of a single constellation. For example, while the GBAS processing module 102 can utilize both the GPS satellites and the Galileo satellites to define VIRs, the GBAS ground station 100 broadcasts differential corrections only for single and multi frequency GPS satellites.

After defining valid iono regions, the GBAS processing module 102 processes signals transmitted by single frequency GNSS satellites 110 that are observable by GBAS ground station 100. Measurements from satellites 110 that fall within the valid iono regions can be used by aircraft's GNSS receiver to compensate for the delay in signal along the aircraft 114's line of sight. In exemplary embodiments, corrections for all observable satellites 112 and 110 are broadcast to aircraft 114 along with the overbound Vertical Ionosphere Gradient standard deviation sigma-vig ($\sigma_{vig}$) via communication device 108.

In exemplary embodiments, the set overbound $\sigma_{vig}$ influences a Vertical Protection Level (VPL) that must meet a Vertical Alert Limit (VAL) required for a precision approach. In some implementations, the set overbound $\sigma_{vig}$ is selected to be a one-$\sigma$ (one-sigma) ionosphere error overbound value, where $\sigma$ (sigma) is the standard deviation. This one-$\sigma$ (one-sigma) ionosphere error overbound value is used when the GBAS ground station 100 determines that enough GNSS satellites fall within the valid iono regions so that the measurements of these satellites will be able to produce a vertical protection limit (VPL) which would be able to meet the vertical alert limit (VAL) required for a precision approach. In exemplary embodiments, the VAL is 10 meters. If the computed VPL is less than VAL, the aircraft 114 is informed of GNSS satellite measurements to be used by aircraft's GNSS receiver to compensate for the delay in signal along the aircraft's line of sight. Aircraft 114 is informed by broadcasting a list of GNSS satellites 112 and 110 that fall within the valid iono regions and have measurements that should be used, or by broadcasting a list of GNSS satellites 112 and 110 that do not fall within the valid iono regions so the measurements of those satellites should not be used.

When the ionospheric health monitor 105 determines that a satellite measurement does not meet a minimum ionosphere quality metric (i.e, the pierce point of the satellite does not fall in a healthy region) more complicated mitigation mechanisms need to be utilized to compensate for the delay observed by aircraft 114. In some embodiments, mitigation techniques such as geometric screening and inflation techniques are used by the GBAS ground station to assist the aircraft to compensate for the delay. In other embodiments, ionospheric storm detected by the ionospheric health monitor 105 is so severe, that the measurements have to be excluded altogether from the list of broadcast corrections.

Figure 3:
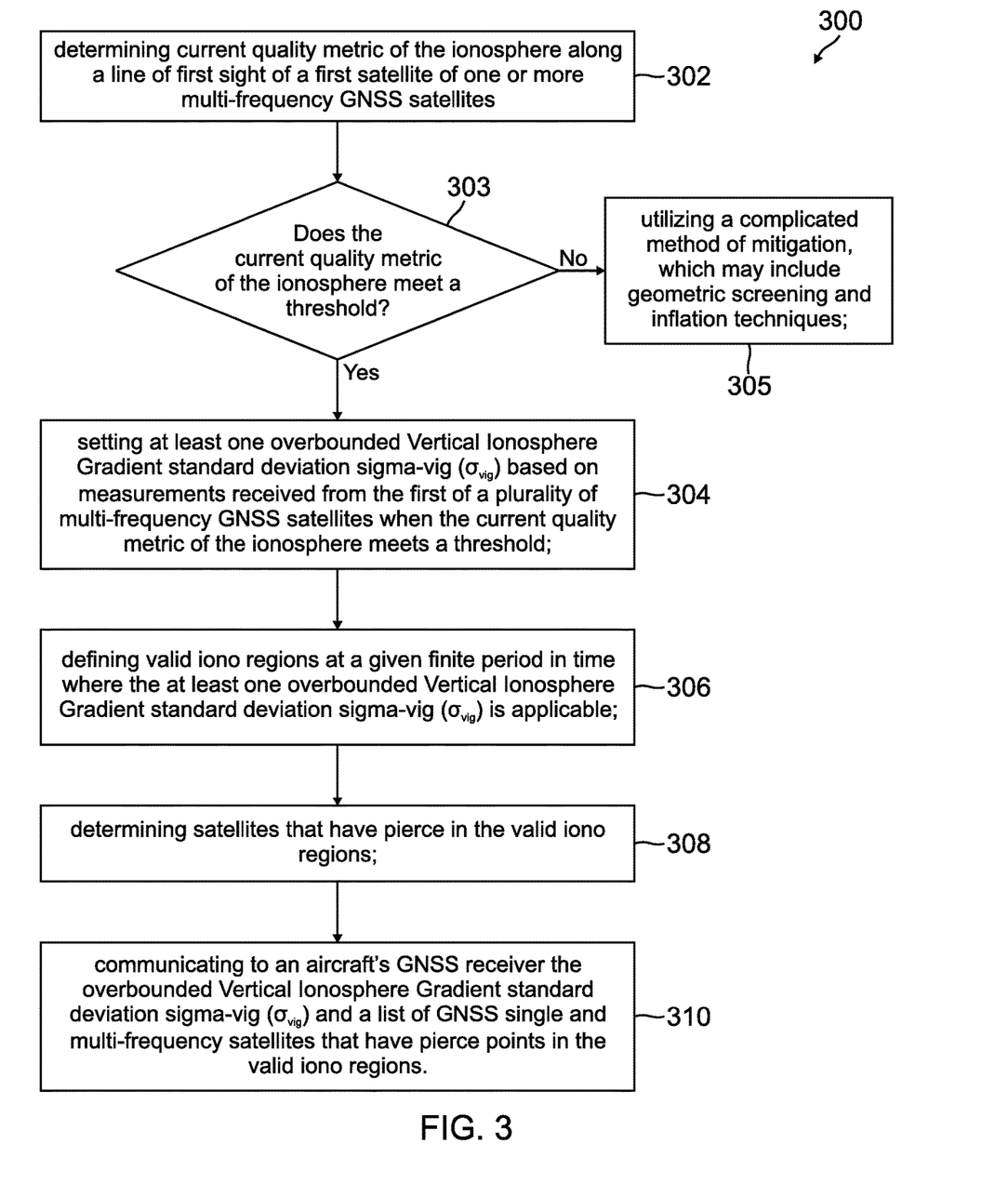
FIG. 3 is a flow diagram illustrating one exemplary embodiment of a method of selecting a GBAS ionospheric threat mitigation technique using multi-frequency satellite.

FIG. 3 is a flow chart illustrating an example method 300 of one embodiment of the present disclosure. In one implementation, one or more elements of method 300 are implemented within a GBAS ground station, such as GBAS ground station 100 discussed above with respect to any of FIG. 1A, 1B or 2. Method 300 is implemented using multi-frequency satellite measurements to mitigate spatial decorrelation errors caused by ionosphere delays. For some embodiments, the method of FIG. 3 may be implemented using any embodiment of a GBAS subsystem or elements thereof described above.

The method starts at block 302 with determining a current quality metric of the ionosphere along a line of sight of a first satellite of one or more multi-frequency GNSS satellites. In some implementations of this method, the current quality metric of the ionosphere is determined by computing a total electron count (TEC) along the line of sight of the first satellite. For example, in one implementation the quality metric is calculated by a GBAS ground station that utilizes a plurality of GBAS reference receivers. In one implementations, computing a TEC further comprises processing signals transmitted by the first satellite at at least two different frequencies and determining the TEC along the line of sight of the first satellite to a respective GBAS reference receiver. In some implementations, the TEC can be quantified by the GBAS ground station using a linear combination of the measured pseudorange and phase observations registered by the GBAS reference receivers 104 at the two carrier frequencies.

The method proceeds to block 303 to with checking if the current quality metric of the threshold is met. When the current quality metric of the ionosphere does not meet a threshold, the method proceeds to block 305 with utilizing a complicated method of mitigation, which in some implementations, may include geometric screening and inflation techniques that can be used by the GBAS ground station to assist the aircraft to compensate for the delay. In other implementations, ionosphere detected can be severe enough that the measurements of the first satellites have to be excluded from broadcast.

When the current quality metric of the ionosphere meets a threshold, the method proceeds to block 304 with setting at least one overbound for Vertical Ionosphere Gradient (VIG) standard deviation sigma-vig ($\sigma_{vig}$) based on measurements received from the first of a plurality of multi-frequency GNSS satellites when the current quality metric of the ionosphere meets a threshold. This overbound can be set by increasing the error bounding distance from the aircraft by adding a K factor and/or a sigma multiplier.

The method proceeds to block 306 with defining valid iono regions at a given finite period in time where the at least one overbounded Vertical Ionosphere Gradient standard deviation sigma-vig ($\sigma_{vig}$) is applicable. In some implementations of this method, valid iono regions may be defined by utilizing multi-frequency satellites from multiple constellations. In a further implementation of this method, while satellites of any or all of the constellations are used to define valid iono regions, differential corrections computed by the GBAS ground station to broadcast to the aircraft's GNSS receiver only includes satellite corrections of one multiple constellation.

The method proceeds to block 308 with determining satellites that have pierce points in the valid iono regions. In some implementations, method 300 further comprises computing differential corrections using satellite measurements of satellites that have a pierce point in one of the valid iono regions. Single frequency satellites having pierce points in one of the valid iono regions may be included in computation of differential corrections.

The method proceeds to block 310 with communicating to an aircraft's GNSS receiver the overbounded Vertical Ionosphere Gradient standard deviation sigma-vig ($\sigma_{vig}$) and a list of GNSS single and multi-frequency satellites that have pierce points in the valid iono regions. In an implementation of this method, communicating to an aircraft the list of GNSS satellites that fall within valid iono regions includes communicating a list of GNSS satellites that have measurements producing a Vertical Protection Limit (VPL) that meets a Vertical Alert Limit (VAL) required for precision approach.

Example Embodiments

Example 1 includes a Ground Based Augmentation System (GBAS) comprising: a plurality of Global Navigation Satellite Systems (GNSS) reference receivers configured to receive signals from single and multi-frequency GNSS satellites; at least one processing module coupled to the plurality of reference receivers; at least one aircraft communication device coupled to the at least one processing module; wherein the at least one processing module is configured to determine a true electron count (TEC) along a line of sight of a first GNSS satellite of a plurality of observable multi-frequency GNSS satellites to determine a current quality metric of the ionosphere; wherein the at least one processing module is further configured to determine at least one overbounded Vertical Ionosphere Gradient standard deviation sigma-vig ($\sigma_{vig}$) when the current quality metric of the ionosphere meets a threshold; wherein the at least one processing module is further configured to define one or more valid iono regions at a given finite period in time where at least one overbounded Vertical Ionosphere Gradient standard deviation sigma-vig ($\sigma_{vig}$) is applicable; and wherein the at least one processing module is further configured to cause the at least one aircraft communication device to communicate to an aircraft's GNSS receiver the at least one overbounded Vertical Ionosphere Gradient standard deviation sigma-vig ($\sigma_{vig}$) and a list of GNSS single and multi-frequency satellites that have pierce points in the valid iono regions.

Example 2 includes the GBAS system of Example 1, wherein the at least one processing module is further configured to compute differential corrections for satellites having pierce points in the valid iono regions and the differential corrections are communicated to the aircraft's GNSS receiver along with the at least one overbounded Vertical Ionosphere Gradient standard deviation sigma-vig ($\sigma_{vig}$) and the list of GNSS single and multi-frequency satellites that have pierce points in the valid iono regions.

Example 3 includes the GBAS system of any of Examples 1-2, wherein the plurality of reference receivers includes four reference receivers.

Example 4 includes the GBAS system of any of Examples 1-3, wherein one or more of the plurality of observable multi-frequency satellites are dual frequency satellites.

Example 5 includes the GBAS system of any of Examples 1-4, wherein the TEC is determined using measurements from a linear combination of pseudo range and phase observations of the satellites registered by the plurality of reference receivers at at least two carrier frequencies.

Example 6 includes the GBAS system of any of Examples 1-5, wherein the at least one overbounded Vertical Ionosphere Gradient standard deviation sigma-vig ($\sigma_{vig}$) includes a single overbounded Vertical Ionosphere Gradient standard deviation sigma-vig ($\sigma_{vig}$)

Example 7 includes the GBAS system of any of Examples 1-6, wherein the plurality of observable multi-frequency satellites include multi-frequency satellites from multiple constellations to define valid iono regions.

Example 8 includes the GBAS system of Example 7, wherein the at least one processing module is further configured to cause the at least one aircraft communication device to broadcast corrections for satellites of only one constellation to the aircraft.

Example 9 includes the GBAS system of any of Examples 1-8, wherein the plurality of reference receivers further comprises only one reference receiver that processes multi frequency satellite signals.

Example 10 includes a method of mitigating spatial decorrelation errors in a Ground Based Augmentation System caused by ionosphere delays, the method comprising: determining a current quality metric of the ionosphere along a line of sight of a first of a plurality of GNSS multi-frequency satellites; setting at least one overbounded Vertical Ionosphere Gradient standard deviation sigma-vig ($\sigma_{vig}$) based on measurements received from the first of a plurality of multi-frequency GNSS satellites when the current quality metric of the ionosphere meets a threshold; defining one or more valid iono regions at a given finite period in time where at least one overbounded Vertical Ionosphere Gradient standard deviation sigma-vig ($\sigma_{vig}$) is applicable; determining which GNSS single and multi-frequency satellites have pierce points in the valid iono regions; and communicating to an aircraft's GNSS receiver the overbounded Vertical Ionosphere Gradient standard deviation sigma-vig ($\sigma_{vig}$) and a list of GNSS single and multi-frequency satellites that have pierce points in the valid iono regions.

Example 11 includes the method of Example 10, further comprising computing differential corrections for all satellites that have a pierce point in one of the valid iono regions and communicating the differential corrections to the aircraft's GNSS receiver along with the at least one overbounded Vertical Ionosphere Gradient standard deviation sigma-vig ($\sigma_{vig}$) and the list of GNSS single and multi-frequency satellites that have pierce points in the valid iono regions.

Example 12 includes the method of any of Examples 10-11, further comprising processing signals from dual frequency satellites to mitigate spatial decorrelation errors caused by ionosphere delays.

Example 13 includes the method of any of Examples 10-12, wherein determining the quality metric further comprises computing a true electron count (TEC) along the line of sight of the first of the one or more multi-frequency satellites.

Example 14 includes the method of any of Examples 10-13, wherein setting at least one overbounded Vertical Ionosphere Gradient standard deviation sigma-vig ($\sigma_{vig}$) includes selecting a single overbounded Vertical Ionosphere Gradient standard deviation sigma-vig ($\sigma_{vig}$).

Example 15 includes the method of any of Examples 10-14, wherein defining one or more valid iono regions at a given finite period in time further comprises checking multi-frequency satellites from multiple constellations where the at least one overbounded Vertical Ionosphere Gradient standard deviation sigma-vig ($\sigma_{vig}$) is applicable along pierce points of the multi-frequency satellites.

Example 16 includes the method of Example 15, wherein computing differential corrections includes computing corrections for satellites of only one of the multiple constellations.

Example 17 includes a Ground Based Augmentation System (GBAS) ground station comprising: a plurality of Global Navigation Satellite Systems (GNSS) reference receivers configured to receive signals from single and dual frequency GNSS satellites; at least one ionospheric health monitor coupled to the plurality of reference receivers; wherein the at least one ionospheric health monitor is configured to determine a true electron count (TEC) along a line of sight of a first GNSS satellite of a plurality of observable dual frequency GNSS satellites to determine a current quality metric of the ionosphere; wherein the at least one ionospheric health monitor is further configured to determine at least one overbounded Vertical Ionosphere Gradient standard deviation sigma-vig ($\sigma_{vig}$) when the current quality metric of the ionosphere meets a threshold; wherein the at least one ionospheric health monitor is further configured to process information from at least one other satellite of the plurality of observable multi-frequency GNSS satellites to define one or more valid iono regions at a given finite period in time where the current quality metric of the ionosphere meets the threshold; wherein the at least one processing module is further configured to cause the at least one aircraft communication device to communicate to an aircraft's GNSS receiver the at least one overbounded Vertical Ionosphere Gradient standard deviation sigma-vig ($\sigma_{vig}$) and a list of single and dual frequency GNSS satellites that have pierce points in the valid iono regions.

Example 18 includes the GBAS ground station of Example 17, wherein the ionospheric health monitor is implemented within a GBAS processing module.

Example 19 includes the GBAS ground station of any of Examples 17 or 18, wherein the ionospheric health monitor is coupled to a memory that includes computer readable instructions for implementing the ionospheric health monitor.

Example 20 includes the GBAS ground station of any of Examples 17-19, wherein the plurality of GNSS reference receivers further comprises only one reference receiver that processes multi frequency satellite signals.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A Ground Based Augmentation System (GBAS) comprising:
    a plurality of Global Navigation Satellite Systems (GNSS) reference receivers configured to receive navigation signals from multi-frequency GNSS satellites;
    at least one processing module coupled to the plurality of reference receivers;
    at least one aircraft communication device coupled to the at least one processing module;
    wherein the at least one processing module is configured to determine a true electron count (TEC) along a line of sight between a first GNSS satellite of a plurality of observable multi-frequency GNSS satellites and at least one GNSS reference receiver of a plurality of reference receivers, and wherein the at least one processing module is further configured to determine a current signal delay quality metric of the ionosphere;
    wherein the at least one processing module is further configured to determine at least one overbounded Vertical Ionosphere Gradient standard deviation sigma-vig (σvig) when the current signal delay quality metric of the ionosphere is at or below a threshold of ionosphere health defined in terms of a difference in signal delay of up to 10 meters between ionospheric delays experienced by the at least one GNSS reference receiver and an aircraft GNSS receiver;
    wherein the at least one processing module is further configured to define one or more valid iono regions at a defined finite period in time where the at least one overbounded Vertical Ionosphere Gradient standard deviation sigma-vig (σvig) is applicable using an ionosphere pierce point of the first GNSS satellite along the line of sight, the defined finite period in time being a period of time during which the first GNSS satellite will have the ionosphere pierce point falling within the one or more valid iono regions; and
    wherein the at least one processing module is further configured to cause the at least one aircraft communication device to communicate to an aircraft's GNSS receiver the at least one overbounded Vertical Ionosphere Gradient standard deviation sigma-vig (σvig) and a list of additional GNSS satellites that have pierce points in the one or more valid iono regions.

2. The GBAS system of claim 1, wherein the at least one processing module is further configured to compute differential corrections for satellites having pierce points in the valid iono regions and the differential corrections are communicated to the aircraft's GNSS receiver along with the at least one overbounded Vertical Ionosphere Gradient standard deviation sigma-vig (σvig) and the list of GNSS single and multi-frequency satellites that have pierce points in the valid iono regions.

3. The GBAS system of claim 1, wherein the plurality of reference receivers includes four reference receivers.

4. The GBAS system of claim 1, wherein one or more of the plurality of observable multi-frequency satellites are dual frequency satellites.

5. The GBAS system of claim 1, wherein the TEC is determined using measurements from a linear combination of pseudo range and phase observations of the satellites registered by the plurality of reference receivers at least two carrier frequencies.

6. The GBAS system of claim 1, wherein the at least one overbounded Vertical Ionosphere Gradient standard deviation sigma-vig (σvig) includes a single overbounded Vertical Ionosphere Gradient standard deviation sigma-vig (σvig).

7. The GBAS system of claim 1, wherein the plurality of observable multi-frequency satellites include multi-frequency satellites from multiple constellations to define valid iono regions.

8. The GBAS system of claim 7, wherein the at least one processing module is further configured to cause the at least one aircraft communication device to broadcast corrections for satellites of only one constellation to the aircraft.

9. The GBAS system of claim 1, wherein the plurality of reference receivers further comprises only one reference receiver that processes multi frequency satellite signals.

10. A method of mitigating spatial decorrelation errors in a Ground Based Augmentation System caused by ionosphere delays, the method comprising:
   determining a true electron count (TEC) along a line of sight between at least one Global Navigation Satellite System (GNSS) reference receiver of a plurality of GNSS reference receivers and a first of a plurality of GNSS multi-frequency satellites;
   determining a current signal delay quality metric of the ionosphere;
   setting at least one overbounded Vertical Ionosphere Gradient standard deviation sigma-vig (σvig) using measurements received from the first of a plurality of multi-frequency GNSS satellites when the current signal delay quality metric of the ionosphere is at or below a threshold of ionosphere health defined in terms of a difference in signal delay of up to 10 meters between ionospheric delays experience by the at least one GNSS reference receiver and an aircraft GNSS receiver;
   defining one or more valid iono regions using an ionospheric pierce point of the first of a plurality of GNSS multi-frequency satellites along the line of sight at a defined finite period in time where at least one overbounded Vertical Ionosphere Gradient standard deviation sigma-vig (σvig) is applicable, the defined finite period in time being a period of time during which the first of the plurality of multi-frequency GNSS satellites will have the ionosphere pierce point falling within the one or more valid iono regions, and determining which additional GNSS satellites have pierce points in one or more valid iono regions; and
   communicating to an aircraft's GNSS receiver the overbounded Vertical Ionosphere Gradient standard deviation sigma-vig (σvig) and a list of GNSS satellites that have pierce points in the valid iono regions.

11. The method of claim 10, further comprising computing differential corrections for all satellites that have a pierce point in one of the valid iono regions and communicating the differential corrections to the aircraft's GNSS receiver along with the at least one overbounded Vertical Ionosphere Gradient standard deviation sigma-vig (σvig) and the list of GNSS single and multi-frequency satellites that have pierce points in the valid iono regions.

12. The method of claim 10, further comprising processing signals from dual frequency satellites to mitigate spatial decorrelation errors caused by ionosphere delays.

13. The method of claim 10, wherein determining the quality metric further comprises computing a true electron count (TEC) along the line of sight of the first of the one or more multi-frequency satellites.

14. The method of claim 10, wherein setting at least one overbounded Vertical Ionosphere Gradient standard deviation sigma-vig (σvig) includes selecting a single overbounded Vertical Ionosphere Gradient standard deviation sigma-vig (σvig).

15. The method of claim 10, wherein defining one or more valid iono regions at the defined finite period in time further comprises checking multi-frequency satellites from multiple constellations where the at least one overbounded Vertical Ionosphere Gradient standard deviation sigma-vig (σvig) is applicable along pierce points of the multi-frequency satellites.

16. The method of claim 15, wherein computing differential corrections includes computing corrections for satellites of only one of the multiple constellations.

17. A Ground Based Augmentation System (GBAS) ground station comprising:
   a plurality of Global Navigation Satellite Systems (GNSS) reference receivers configured to receive navigation signals from GNSS satellites;
   at least one ionospheric health monitor coupled to the plurality of reference receivers;
   wherein the at least one ionospheric health monitor is configured to determine a true electron count (TEC) along a line of sight between a first GNSS satellite of a plurality of observable dual frequency GNSS satellites and at least one GNSS reference receiver of a plurality of reference receivers,
   wherein the at least one ionospheric health monitor is further configured to determine a signal delay quality metric of the ionosphere;
   wherein the at least one ionospheric health monitor is further configured to determine at least one overbounded Vertical Ionosphere Gradient standard deviation sigma-vig (σvig) when the quality metric of the ionosphere is at or below a threshold of ionosphere health defined in terms of a difference in signal delay of up to 10 meters between ionospheric delays experience by the at least one GNSS reference receiver and an aircraft GNSS receiver;
   wherein the at least one ionospheric health monitor is further configured to process information from at least one other satellite of the plurality of observable multi-frequency GNSS satellites to define one or more valid iono regions at a defined finite period during which the first GNSS satellite will have the ionosphere pierce point falling within the one or more valid iono regions, and using an ionosphere pierce point of the first GNSS satellite along the line of sight; and
   wherein at least one processing module is further configured to cause the at least one aircraft communication device to communicate to an aircraft's GNSS receiver the at least one overbounded Vertical Ionosphere Gradient standard deviation sigma-vig ($\sigma$vig) and a list of additional GNSS satellites that have pierce points in one or more valid iono regions.

18. The GBAS ground station of claim 17, wherein the ionospheric health monitor is implemented within a GBAS processing module.

19. The GBAS ground station of claim 17, wherein the ionospheric health monitor is coupled to a memory that includes computer readable instructions for implementing the ionospheric health monitor.

20. The GBAS ground station of claim 17, wherein the plurality of GNSS reference receivers further comprises only one reference receiver that processes multi frequency satellite signals.

* * * * *